(12) United States Patent
Muraza et al.

(10) Patent No.: US 9,186,659 B2
(45) Date of Patent: Nov. 17, 2015

(54) CONTROLLED GROWTH OF MTT ZEOLITE BY MICROWAVE-ASSISTED HYDROTHERMAL SYNTHESIS

(71) Applicants: King Fahd University of Petroleum and Minerals, Dhahran (SA); King Abdulaziz City for Science and Technology, Riyadh (SA)

(72) Inventors: Oki Muraza, Dhahran (SA); Idris Bakare, Dhahran (SA); Adnan Al Amer, Dhahran (SA); Zain Yamani, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 212 days.

(21) Appl. No.: 14/151,498

(22) Filed: Jan. 9, 2014

(65) Prior Publication Data

US 2015/0190792 A1    Jul. 9, 2015

(51) Int. Cl.
*C01B 39/48* (2006.01)
*B01J 29/70* (2006.01)
*C01B 39/46* (2006.01)

(52) U.S. Cl.
CPC ............. *B01J 29/7046* (2013.01); *C01B 39/46* (2013.01)

(58) Field of Classification Search
CPC .............................. C01B 39/48; B01J 29/7046
See application file for complete search history.

(56) References Cited

U.S. PATENT DOCUMENTS

| | | | | |
|---|---|---|---|---|
| 4,076,842 A * | 2/1978 | Plank | ....................... | B01J 29/70 423/704 |
| 4,778,666 A * | 10/1988 | Chu | .................... | C01B 33/2884 204/157.43 |
| 6,656,345 B1 * | 12/2003 | Chen | ...................... | C10G 11/05 208/113 |
| 2010/0098623 A1* | 4/2010 | Gagea | ..................... | C01B 37/00 423/704 |
| 2011/0201861 A1* | 8/2011 | Bulut | ...................... | B01J 29/40 585/446 |
| 2014/0241981 A1* | 8/2014 | Dutta | ................. | B01D 67/0051 423/709 |

FOREIGN PATENT DOCUMENTS

CN         101613114 B     5/2012

OTHER PUBLICATIONS

Cundy et al, "Remarkable synergy between microwave heating and the addition of seed crystalas in zeolite synethesis—a suggestion verified", Chem. Commun. (1998) pp. 1465-1466.*
Zhao et al, "Synthesis of zeolites in a microwave heating environment", Progress in Zeolite and Microporous Materials, vol. 105, (1997), pp. 181-187.*

(Continued)

*Primary Examiner* — David M Brunsman
(74) *Attorney, Agent, or Firm* — Oblon, McClelland, Maier & Neustadt, L.L.P.

(57) ABSTRACT

This invention relates a process for preparing MTT zeolites which process includes the preparation of a sol-gel from an aluminate solution, mixing a structure directing agent with the sol-gel to form a structure directing mixture, mixing a silica with the structure directing mixture to form a reaction mixture, heating the reaction mixture in a microwave reactor to form an initial zeolite, and removing the structure directing agent to form the MTT zeolite. The invention also relates to MTT zeolites produced by the process, including ZSM-23 zeolites, as well as zeolite membranes, coating and catalysts.

19 Claims, 5 Drawing Sheets

(56) References Cited

OTHER PUBLICATIONS

Oki Muraza, et al., "Controlled an Rapid Growth of MTT Zeolite Crystals With Low-Aspect-Ratio in a Microwave Reactor", Chemical Engineering Journal, vol. 226, Jun. 15, 2013, 1 page.

Oki Muraza, et al., "Nanosized of Zeolites With One-Dimensional (I) Pore Systems and Their Applications in Catalytic Cracking", Proceedings 22$^{nd}$ Saudi Japan Annual Symposium, Catalysts in Petroleum Refining & Petrochemicals, KFUPM Dhahran, Saudi Arabia, Nov. 25-26, 2012, 3 pages.

Karin Moller, et al., "Crystallization and Porosity of ZSM-23", Microporous and Mesoporous Materials, vol. 143, Issues 2-3, Sep. 2011, 1 page.

Ye Liu, et al, "Synthesis of ZSM-23 Zeolite Using Isopropylamine As Template", Chinese Journal Catalysis, vol. 30, Issue 6, Jun. 2009, 1 page.

\* cited by examiner

Figure 1

Figures 2(a)-(b) and (d)

CONTROLLED GROWTH OF MTT ZEOLITE BY MICROWAVE-ASSISTED HYDROTHERMAL SYNTHESIS

BACKGROUND OF THE INVENTION

1. Field of the Invention

This invention relates to a process for producing a zeolite possessing an MTT-type framework structure, specifically ZSM-23, by employing microwave irradiation, the zeolite produced by the process, membranes and coatings containing this zeolite, and zeolite catalysts containing this zeolite.

2. Discussion of the Related Art

Zeolitic materials, both natural and synthetic, are known to have catalytic properties for various reactions. Certain zeolitic materials are ordered, porous crystalline metallosilicates having a definite crystalline structure as determined by X-ray diffraction. Within these ordered, porous structures there are a number of smaller cavities which can be interconnected by a number of even smaller channels or pores.

Under ideal circumstances the cavities and pores of zeolitic materials are uniform in size. Because the dimensions of these pores allow for the adsorption the molecules of certain dimensions while rejecting other molecules of larger dimensions, zeolitic materials have come to be known as "molecular sieves" and are utilized to exploit this phenomenon of selective adsorption.

Such molecular sieves, both natural and synthetic, include a wide variety of positive ion-containing crystalline aluminosilicates. These aluminosilicates have a rigid three-dimensional framework of $SiO_4$ and $AlO_4$ in which the tetrahedra are cross-linked by the sharing of oxygen atoms such that the ratio of the total aluminum and silicon atoms to oxygen atoms is 1:2. The electro valence of the tetrahedra containing aluminum is balanced by the inclusion in the crystal of a cation, for example an alkali metal or an alkaline earth metal cation.

This cross-linked framework can be expressed by the relationship of aluminum to the cations, wherein the ratio of aluminum to the number of various cations, such as Ca/2, Sr/2, Na, K, Cs or Li, is equal to unity. One type of cation may be exchanged entirely or partially with another type of cation utilizing ion exchange techniques in a conventional manner. By using such cation exchange, it has been possible to vary the properties of a given aluminosilicate by suitable selection of the cation.

Earlier techniques have resulted in the formation of a great variety of synthetic porous, crystalline metallosilicate zeolites. The zeolites have come to be designated by letter or other convenient symbols, as illustrated by zeolite A (U.S. Pat. No. 2,882,243), zeolite L (U.S. Pat. No. 3,130,006), zeolite X (U.S. Pat. No. 2,882,244), zeolite Y (U.S. Pat. No. 3,130,007), zeolite ZK-5 (U.S. Pat. No. 3,247,195), zeolite beta, (U.S. Pat. No. 3,308,069), zeolite ZK-4 (U.S. Pat. No. 3,314,752), zeolite ZSM-4 (Great Britain Pat. No. 1,117,568), zeolite ZSM-5 (U.S. Pat. No. 3,702,886, now U.S. Pat. No. Re. 29,948), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-22, zeolite, ZSM-23 (U.S. Pat. No. 4,076,842), zeolite ZSM-34, zeolite ZSM-35 (U.S. Pat. No. 4,016,245), zeolite ZSM-39 (U.S. Pat. No. 4,259,306), zeolites ZSM-21 and ZSM-38 (U.S. Pat. No. 4,046,859), ZSM-48 (U.S. Pat. No. 4,375,573), ZSM-51 (U.S. Pat. No. 4,568,654), zeolite EU-1 (European Patent Application 0042 226), zeolite EU-2 (UK Patent Application No. GB 2077709 A), zeolite EU-4 (European Patent Application No. 0 063 436), and zeolites NU-6(1) and NU-6(2) (U.S. Pat. No. 4,397,825), merely to name a few.

Zeolites containing a framework element other than, or in addition to, aluminum, e.g., boron, iron, titanium, zirconium, germanium, gallium, etc., are known from, by example, U.S. Pat. Nos. 3,328,119; 3,329,480; 3,329,481; 4,414,423 and 4,417,088.

The $SiO_2/Al_2O_3$ ratio of a given zeolite is often variable. For example, zeolite X can be synthesized with $SiO_2/Al_2O_3$ ratios of from 2 to 3, and zeolite Y can be synthesized with $SiO_2/Al_2O_3$ ratios from 3 to about 6. In some zeolites, the upper limit of the $SiO_2/Al_2O_3$ ratio is unbounded. ZSM-5 is one such example wherein the $SiO_2/Al_2O_3$ ratio ranges from at least 5 up to infinity.

Because the catalytic activity of zeolite is affected in part by the size of the channels and pores responsible for selective absorption, micropore size is an important characteristic in these materials. Zeolites that are most widely used catalytic materials in oil refining and petro-chemicals typically have micropores less than 1 nm which limits mass-transfer of molecules into and out of the micropores.

In addition to micropore size affecting the mass-transfer limitation, the morphology of zeolites may also affect absorption and the resulting catalytic activity. Some zeolites with one-dimensional (1D) pore systems have needle and rod-like morphologies where the pore-mouth can be blocked by coke deposition. In addition to the mass-transfer problem, several silicon-aluminate crystals have needle- or rod-like crystal shapes which may also be subject to rapid deactivation due to their morphology.

Needle-like crystals with very high crystal aspect-ratio (length-to-width ratio) are common in certain zeolitic frameworks. Because the one-dimensional channels in these zeolites are parallel to the growth direction of the needle crystals, the catalytic activity of such zeolites can degrade over time due to the resulting long diffusion path.

Zeolite morphology can be affected by controlling the process of crystallization. Zeolite catalysts having efficient mass-transfer properties can be obtained by reducing the crystals size of zeolites to sub-micrometer and even to nanometer range. This mechanism of size reduction is aimed at reducing the diffusion path length of reactant molecules into the active sites in zeolite crystals.

Synthetic zeolites are generally prepared by providing an aqueous solution of the desired oxides and other required components of the crystallization reaction medium and thereafter crystallizing the zeolite under heat and pressure. An ideal crystallization method directed to catalytic zeolites would provide relatively small crystals at higher rates of productivity compared to known hydrothermal crystallization procedures.

Relatively small zeolitic crystals exhibit greater catalytic activity because their relatively small size permits faster diffusion of reactants into the catalytic sites (absorption), as well as faster diffusion of products out of the catalytic sites (desorption). While the rate of nucleation leading to zeolytic crystallization is not greatly influenced by temperature, the crystal growth process itself is more temperature-sensitive so that when conventional hydrothermal processes are utilized in obtaining relatively small crystals it is necessary to reduce the temperature.

Consequently, in order to obtain relatively small crystals, conventional hydrothermal crystallization processes require significantly more time to effect crystallization leading to ideally small zeolyte crystals. Such longer crystallization periods not only reduce productivity, but they also increase the risk that the desired crystalline material will become contaminated with undesirable crystalline material.

One approach to solving this dilemma involves the use of structure-directing or templating agents to bias favorable crystallization. When small-molecule organic compounds are employed for this purpose, they are often referred to as organic structure directing agents (OSDA).

In such an approach, aluminophosphates, for example, may be prepared by hydrothermal crystallization of a reaction mixture containing a reactive source of phosphate, alumina and water and at least one OSDA which can include, for example, an organic amine and a quarternary ammonium salt. Alternatively, silicoaluminophosphates, for example, may be synthesized by hydrothermal crystallization of a reaction mixture containing reactive sources of silica, alumina and phosphate, in the presence of an OSDA, preferably with a compound of an element of Group VA of the Periodic Table, and optionally in the presence of an alkali metal. In both of these methods, hydrothermal crystallization occurs in a reaction vessel inert toward the reaction system by heating until sufficient crystallization is complete—usually for period lasting as long as two weeks. The solid crystalline reaction product is then recovered by any convenient method such as filtration or centrifugation.

Zeolites with the MTT topology are molecular sieves having pores defined by parallel non-intersecting 5-, 6- and 10-membered ring (MR) channels having cross-sectional dimensions of about 4.5 Angstrom by about 5.2 Angstrom. Examples of MTT framework type molecular sieves include ZSM-23, SSZ-32, EU-13, ISI-4 and KZ-I. ZSM-23, which is a MTT zeolite having medium-sized pores composed of one dimensional pores made up of 10-membered rings, is known to be a potential catalyst for dewaxing, skeletal isomerization of paraffin, selective catalytic cracking and related shape-selective reactions.

One variant of ZSM-23 is composed of 10-membered-rings channels having pore diameters of 0.45×0.52 nm. This variant may be useful as a solid-acid catalyst for a number of important refinery processes such as selective cracking and isomerization. However, long-needle crystals of ZSM-23 are known to cause short catalytic lifetime due to blockage of the zeolite pore mouth by coke species. See S. van Donk, J. H. Bitter, K. P. de Jong, Deactivation of solid acid catalysts for butane skeletal isomerization: on the beneficial and harmful effects of carbonaceous deposits, *Appl. Catal. A: Gen.*, 212 (2001) 97-116.

Other limitations of ZSM-23 relate to the inability with the conventional hydrothermal crystallization techniques to adequately control the acidity and the Si/Al ratio of the formed zeolite.

ZSM-23 can be synthesized using different OSDAs such as pyrolidine, isopropyl amine and a range of organic amines and quaternary ammonium templates. See K. Möller, T. Bein, Crystallization and porosity of ZSM-23, Micropor. Mesopor. Mater., 143 (2011) 253-262; C. Baerlocher, W. H. Meier, D. H. Olson, Atlas of Zeolite Frameworks Types (5th ed., 2001) (Elsevier, Amsterdam) 266; G. Kuhl, Verified Syntheses of Zeolitic Materials (2nd ed., 2001) (Elsevier, Amsterdam) 258. Rollmannn and co-workers extended the OSDAs which can be applied in MTT synthesis. See The Atlas of Zeolite Structure Types, www.iza-online.org.

The synthesis of ZSM-23 by conventional hydrothermal synthesis has been reported elsewhere such as U.S. Pat. No. 5,332,566 and U.S. Pat. No. 4,490,342.

The typical synthesis time of ZSM-23 in hydrothermal synthesis is between 66 and 72 hours with a relatively narrow synthesis window. K. Möller, T. Bein, Crystallization and porosity of ZSM-23, *Micropor. Mesopor. Mater.*, 143 (2011) 253-262. Further, the range of acidities (relating to the Si/Al ratio) of the resulting MTT zeolites is considered to be relatively small.

The unique properties of H-ZSM-23 zeolite in particular correspond with its one-dimensional non-interacting 10 member-ring (10-MR) structures having pore channels of 0.46×0.57 nm. A. W. Burton, *A Priori* Phase Prediction of Zeolites: Case Study of the Structure-Directing Effects in the Synthesis of MTT-Type Zeolites, *J. Am. Chem. Soc.*, 129 (2007) 7627-37. However, blockage of the zeolite pore mouth by the coke and other species of byproducts is considered to account for the relatively rapid deactivation of H-ZSM-23. S. van Donk, J. H. Bitter, K. P. de Jong, Deactivation of solid acid catalysts for butane skeletal isomerization: on the beneficial and harmful effects of carbonaceous deposits, *Appl. Catal. A: Gen.*, 212 (2001) 97-116. Furthermore, common methods to improve porosity such as desilication have resulted in detrimental effects to zeolite morphology, blockage of microporosity, and uncontrolled Al removal. D. S. Kim, J. S. Chang, J. S. Hwang, S. E. Park S E, J. M, Kim, Synthesis of zeolite beta in fluoride media under microwave irradiation, *Micropor. Mesopor. Mater.*, 68 (2004) 77-82.

Efforts to improve mass-transfer in one-dimensional (1D) pore zeolites can be classified into two strategies: (i) scaling-down the crystal size from micrometer to nanometer; and (ii) development of a hierarchical pore system. Möller and Bein reported the preparation of a high crystal-aspect-ratio (length/width) variant of ZSM-23, wherein a crystal-aspect-ratio above 400 was obtained. K. Möller, T. Bein, Crystallization and porosity of ZSM-23, *Micropor. Mesopor. Mater.*, 143 (2011) 253-62. This high aspect-ratio, however, induces fast deactivation and such rod-like morphology can be easily poisoned by cokes tending to block the pore-mouth.

Therefore, development of MTT crystals having shorter crystals with significantly lower crystal-aspect-ratios is one aspect of the present disclosure, because lowering of the crystal-aspect-ratio may reduce diffusion constraints which limit the catalytic effectiveness of ZSM-23. Another aspect of the present disclosure relates to the unfavorable synthesis constraints on the preparation of ZSM-23 using conventional techniques as well as the presence of impurity phases such as cristobalite and dodecasil. See A. W. Burton, A Priori Phase Prediction of Zeolites: Case Study of the Structure-Directing Effects in the Synthesis of MTT-Type Zeolites, *J. Am. Chem. Soc.*, 129 (2007) 7627-37.

Microwave-assisted hydrothermal synthesis (MAHyS) has found many applications in synthetic chemistry to shorten synthesis time, to produce narrow size distribution, and to obtain different morphologies. See Mintova, N. H. Olson, V. Valtchev, T. Bein, Mechanism of Zeolite A nanocrystal growth from colloids at room temperature, *Science*, 283 (1999) 958-60; D. S. Kim, J. S. Chang, J. S. Hwang, S. E. Park SE, J. M, Kim, Synthesis of zeolite beta in fluoride media under microwave irradiation, *Micropor. Mesopor. Mater.*, 68 (2004) 77-82; O. Muraza, E. V. Rebrov, J. Chen, M. Putkonen, L. Niinistö L, M. H. J. M, de Croon, J. C. Schouten, Microwave-assisted hydrothermal synthesis of zeolite Beta coatings on ALD-modified borosilicate glass for application in microstructured reactors, *Chem. Eng. J.*, 135 (2008) S117-S120. A range of nanozeolites have been reported using MAHyS (e.g., MFI, BEA, LTL, and LTA).

In some instances, the use of MAHyS appears to reduce the time required for zeolite crystallization. For instance, Li and co-workers reported rapid fabrication of MOR zeolites by MAHyS where the synthesis time was reduce to 6 hours at 190° C. G. Li, H. M. Hou, R. S. Lin, Rapid synthesis of mordenite crystals by microwave heating, *Solid State Sci.*, 13

(2011) 662-64. The use of MAHyS in the presence of OSDAs has also been reported for preparing a number of zeolites. See, e.g., U.S. Pat. No. 4,778,666.

Although MAHyS can be used with OSDAs to affect greater control of the crystallization of certain zeolites. The existing methodology is insufficiently rapid and reliable for producing MTT zeolite crystals such as ZSM-23 possessing the characteristics of relatively small pore size and crystal-aspect-ratio. Improved morphologies applicable to catalysts having significantly longer catalytic lifetimes than previously known ZSM-23 zeolites are therefore needed.

The present disclosure has been made to address the above-described problems.

One objective of this disclosure is to provide a method for controlled nucleation and growth of MTT zeolites by using MAHyS, to allow a synthesis of MTT zeolites such as ZSM-23 which is rapid and produces MTT zeolites having relatively small crystal sizes with low crystal-aspect-ratios and with improved morphologies that are less susceptible to impurities and catalytic deactivation. A further objective of the present disclosure is to provide MTT zeolites having improved catalytic properties by optimization of synthesis parameters and by employing techniques such as structure-directed synthesis, seed-assisted synthesis and alkaline post-treatment.

Additional objects, advantages and other features of the present disclosure will be set forth in part in the description that follows and in part will become apparent to those having ordinary skill in the art upon examination of the following or may be learned from the practice of the present disclosure. The advantages of the present disclosure may be realized and obtained as particularly pointed out in the appended claims. As will be realized, the present disclosure is capable of other and different embodiments, and its several details are capable of modifications in various respects, all without departing from the present disclosure. In this regard, the description herein is to be understood as illustrative in nature, and not as restrictive.

BRIEF SUMMARY OF THE INVENTION

Preferred embodiments of the disclosure are described herein such that one of skill in this art can make and use them.

One embodiment relates to a process for preparing an MTT zeolite. This process comprises preparing a sol-gel by dissolving a metal hydroxide with water, then mixing with an aluminum compound, to form an aluminate solution, to form the sol-gel; mixing a structure directing agent with the sol-gel in a controlled manner over an addition time period to form a structure directing mixture; adding a silica with the structure directing mixture to form a reaction mixture; heating the reaction mixture in a microwave reactor at a crystallization temperature for a crystallization time period with stirring at a crystallization stirring speed to form an initial zeolite; and removing the structure directing agent to form an MTT zeolite, wherein the crystallization time period ranges from 12 hours to 72 hours.

In another aspect the structure directing agent is an organic structure directing agent.

In another aspect the structure directing agent is isopropyl amine.

In another aspect the structure directing agent is isopropyl amine and the MTT zeolite is a ZSM-23 zeolite.

In another aspect a crystal aspect ratio of the ZSM-23 is less than or equal to 12.

In another aspect the metal hydroxide is sodium hydroxide, the aluminum compound is aluminum sulfate, the structure directing agent is isopropyl amine, the silica is a colloidal silica, the crystallization temperature is equal to or greater than 170° C. and equal to or less than 190° C., the crystallization time period is equal to or less than 18 hours, and the crystallization stirring speed is greater than or equal to 250 rpm and equal to or less than 300 rpm.

In another aspect the reaction mixture comprises the following components: silica: 1.0; aluminum compound: 0.001 to 0.1; metal hydroxide: 0.001 to 1.0; structure directing agent: 0.1 to 15.0; and water: 5 to 200, based on relative molar ratios.

In another aspect the reaction mixture comprises the following components: silica: 1.0; aluminum compound: 0.004 to 0.01; metal hydroxide: 0.1 to 0.250; structure directing agent: 0.75 to 5.0; and water: 30 to 75, based on relative molar ratios.

In another aspect the reaction mixture comprises the following components: $SiO_2$: 1.0; aluminum sulfate: 0.005 to 0.007; NaOH: 0.11 to 0.15; isopropyl alcohol: 1.0 to 2.0; and water: 40 to 50, based on relative molar ratios.

In another aspect the crystallization stirring ranges from 200 to 300 rpm.

In another aspect a frequency of the microwave reactor ranges from about 900 MHz to about 3600 MHz.

In another aspect a reaction vessel containing the reaction mixture is a PTFE reaction vessel equipped with a fiber optic monitoring device.

In another aspect the crystallization time period ranges from 12 hours to 24 hours to form rod-like or column-like crystals ranging from 75 nm to 700 nm.

Another embodiment relates to an MTT zeolite produced using a process of the present disclosure.

Another embodiment relates to a ZSM-23 zeolite produced using a process of the present disclosure.

Another embodiment relates to a zeolite membrane which comprises a ZSM-23 zeolite produced using a process of the present disclosure.

Another embodiment relates to a zeolite coating layer which comprises a ZSM-23 zeolite produced using a process of the present disclosure.

Another embodiment relates to a zeolite catalyst which comprises a ZSM-23 zeolite produced using a process of the present disclosure.

BRIEF DESCRIPTION OF THE SEVERAL DRAWINGS

FIGS. 2(a), 2(b) and 2(d) depict FE-SEM images of MTT zeolites synthesized with different irradiation times at 180° C. versus a conventional MTT zeolite.

FIGS. 5(a)-5(b) depicts FE-SEM images of MTT zeolites synthesized by MAHyS and seeding with 1 wt. % of seeds using different crystallization time periods.

DETAILED DESCRIPTION OF THE INVENTION

Now, embodiments of the present disclosure will be described below in detail with reference to the accompanying figures.

By the methodology disclosed herein MTT zeolite crystals are produced using MAHyS in the presence of an OSDA, such as isopropyl alcohol. The resulting MTT zeolites possess far superior properties than previously known MTT zeolites which suffered from sub-standard properties such as high crystal aspect-ratio, high agglomeration rate and low-pore volume. The superior properties of the MTT zeolites described herein were measured and verified using X-ray diffraction (XRD), field-emission scanning electron microscopy (FE-SEM), nitrogen adsorption-desorption, and solid-state $^{27}$Al nuclear magnetic resonance ($^{27}$Al-NMR) spectrometry.

Remarkably, the process of the present disclosure provides MTT zeolites having significantly improved properties in a manner such that the synthesis time required to reach full crystallinity is greatly reduced from about 68 hours for convention techniques to only about 12 hours for a particular ZSM-23 using an embodiment of the present disclosure.

Microwave irradiation conditions can be controlled to allow optimal nucleation and crystallization of zeolites possessing MTT structure, including ZSM-23, by using hydrothermal synthesis, such that the hydrothermal reactions occur much faster than conventional syntheses while both inhibiting intergrowth and reducing phase impurities.

The process disclosed herein unexpectedly increases the rate of MTT nucleation by as much as five fold or greater, relative to conventional syntheses, to produce ZSM-23, for example, with relatively low crystal aspect ratios. Furthermore, the present process significantly reduces the occurrence of unwanted morphological forms that tend to adversely affect catalytic activity and/or lead to premature deactivation of the produced catalysts. The advantages provided by the present disclosure are enhanced through the use of structure directing agents and optionally crystal seeding.

MTT structured zeolites such as ZSM-23 zeolites produced by a process according to the present disclosure are useful in a variety of applications including the production and use of shape-selective catalysts for various reactions, the production and use of zeolite-containing membranes and absorbents, as well as various zeolitic coating applications. First, a rapid synthesis of MTT zeolites is described. The microwave-assisted synthesis of MTT zeolites (esp. ZSM-23) described herein is very fast compared to conventional hydrothermal synthesis. Second, the power consumption required to produce MTT zeolites is significantly reduced relative to conventional hydrothermal syntheses. Third, the rapid crystallization of the MTT framework is also applicable to deposition of zeolite crystals on many different substrates for applications including zeolite membranes and zeolitic coatings. Fourth, novel zeolite catalysts are produced having improved characteristics and providing improved catalyst activity and lifetime.

As used herein the terms composed of, contains, containing, and terms similar thereto, when referring to the ingredients, parts, reactants, etc., of a composition, component, etc., to method steps, etc., mean, in their broadest sense, "includes at least" (i.e., comprises) but also include within their definition all those gradually restricted meanings until and including the point where only the enumerated materials or steps are included (e.g., consisting essentially of and consisting of).

One embodiment of the present disclosure relates to a process for preparing an MTT zeolite.

This process comprises:

preparing a sol-gel by combining a metal hydroxide with water, then mixing with an aluminum compound, to form an aluminate mixture, to form the sol-gel;

mixing in a structure directing agent to the sol-gel, in a controlled addition over an addition time period, to form a structure directing mixture;

mixing in a silica followed by vigorous agitation to form a reaction mixture;

heating the reaction mixture in a microwave reactor at a crystallization temperature for a crystallization time period with stirring at a crystallization stirring speed, to form an initial zeolite; and removing the structure directing agent to form an MTT zeolite, wherein the crystallization time period ranges from 12 hours to 72 hours.

Using the above-described process, a variety of MTT zeolites can be prepared such that the time required to reach full MTT crystallinity is greatly reduced relative to conventional hydrothermal syntheses. A key aspect of this discovery involves the use of microwave-assisted hydrothermal synthesis (MAHyS) in combination with the use of a particular structure directing agent, such as an organic structure directing agent (OSDA). The present disclosure is especially suitable for the rapid and efficient preparation of ZSM-23 having superior characteristics compared to ZSM-23 prepared by conventional hydrothermal synthesis.

The present process employing MAHyS and a particular OSDA has demonstrated an ability to reach full MTT crystallinity in only 12 hours—whereas, a similar MTT zeolite produced using conventional hydrothermal synthesis requires 68 hours.

Synthetic zeolites are generally prepared by providing an aqueous solution of the desired oxides and other required components of the crystallization reaction medium and thereafter crystallizing the zeolite under heat and pressure.

In making the MTT zeolites of the present disclosure, representative reactants are silica gel, silicic acid or sodium silicate as a source of silica. Alumina may be obtained from activated alumina, gamma alumina, alpha alumina, alumina trihydrate, or sodium aluminate. Sodium hydroxide may supply the sodium ion and in addition assist in controlling the pH. Preferably the reactants are water soluble.

A solution or mixture of the reactants in proper proportions is placed in a container, suitably of glass or other material which does not significantly interfere with the passage of microwave radiation. The container is preferably closed to prevent loss of water and the reactants are subjected to microwave heating for the required time.

A convenient and preferred procedure for preparing the reactant mixture is to make an aqueous solution containing the sodium aluminate and hydroxide and add this mixture, preferably with agitation, to an aqueous solution of sodium silicate. The system is stirred until homogeneous or until any gel which forms is converted into a nearly homogeneous mix. After this mixing, agitation may be stopped as it is unnecessary to agitate the reacting mass during the formation and crystallization of the zeolite, however, mixing during formation and crystallization has not been found to be detrimental. The initial mixing of ingredients may be performed at room temperature but this is not essential.

The present disclosure may include the formation of a sol-gel. In this form, the 'sol' (or solution) gradually evolves towards the formation of a gel-like diphasic system containing both a liquid phase and solid phase whose morphologies range from discrete particles to continuous polymer networks. In the case of a colloid, the volume fraction of particles (or particle density) may be so low that a significant amount of fluid may need to be removed initially for the gel-like properties to be recognized. This can be accomplished in any number of ways. The simplest method is to allow time for sedimentation to occur, and then pour off the remaining liquid. Centrifugation can also be used to accelerate the process of phase separation.

Removal of the remaining liquid (solvent) phase requires a drying process, which is typically accompanied by a significant amount of shrinkage and densification. The rate at which the solvent can be removed is ultimately determined by the distribution of porosity in the gel.

The ultimate microstructure of the final component will be strongly influenced by changes imposed upon the structural template during this phase of processing. This includes the influence of an structure directing agent such as an OSDA.

Following sol gel formation, a thermal treatment, or firing process, is often necessary in order to favor further polycondensation and to enhance mechanical properties and structural stability via a final sintering, densification and grain growth. One of the distinct advantages of using a sol gel methodology as opposed to the more traditional processing techniques is that densification is often achieved at a much lower temperature.

A precursor sol can be either deposited on a substrate to form a film (e.g., by dip coating or spin coating), cast into a suitable container with the desired shape (e.g., to obtain monolithic ceramics, glasses, fibers, membranes, aerogels), or used to synthesize powders (e.g., microspheres, nanospheres).

The sol-gel approach is an inexpensive and low-temperature technique that allows for the fine control of the product's chemical composition. Even small quantities of dopants, such as organic dyes and rare earth elements, can be introduced in the sol and end up uniformly dispersed in the final product.

In one aspect of the present disclosure, a colloidal silica sol (30% $SiO_2$), a source of alumina, a source of a metal M (e.g., Al), an OSDA and deionized water are mixed together to form a hydrogel. The source of alumina may be, for example, aluminum sulfate (i.e., $(Al_2(SO_4)_3).18H_2O$)). Sodium aluminate may be the source of the alumina. When needed to adjust the $OH^-/SiO_2$ molar ratio, sulfuric acid may be used. The metal M may be $Na^+$ or $K^+$, but is not limited to these ions.

Aluminophosphates may be prepared by MAHyS of a reaction mixture prepared by combining a reactive source of phosphate, alumina and water and at least one structure-directing or templating agent which can include an organic amine and a quarternary ammonium salt. The silicoaluminophosphates are synthesized by hydrothermal crystallization from a reaction mixture containing reactive sources of silica, alumina and phosphate, an organic template, i.e., structure-directing agent, preferably with a compound of an element of Group VA of the Periodic Table, and optionally an alkali metal.

Various OSDAs may be employed for the synthesis of zeolitic crystalline materials. For example, the zeolite ZSM-5 may be produced from a reaction mixture comprising, as a directing agent, an alkyldiamine. Other useful OSDAs may include triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

The ZSM-5 family of zeolites may be formed as an aluminosilicate. The composition can be prepared utilizing materials which supply the appropriate oxide. Such compositions include for an aluminosilicate, sodium aluminate, alumina, aluminum sulfate, sodium silicate, silica hydrosol, silica gel, silicic acid, sodium hydroxide or other Group IA or IIA hydroxides, and tetraalkylammonium compounds, e.g. tetrapropylammonium bromide. In addition to tetrapropylammonium compounds, tetramethyl, tetraethyl or tetrabutyl ammonium compounds can similarly be employed. Glycols such as ethylene glycol are also useful for this purpose.

Each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate:tetrapropylammonium cation can be supplied by the hydroxide.

The reaction mixture can be prepared either batchwise or continuously.

The composition for the synthesis of synthetic ZSM-23 can be prepared utilizing materials which can supply the appropriate oxide. Such materials include aluminates, alumina, silicates, silica hydrosol, silica gel, silicic acid and hydroxides. It will be understood that each oxide component utilized in the reaction mixture for preparing ZSM-23 can be supplied by one or more essential reactants and they may be mixed together in any order. For example, the alkali metal can be supplied by an aqueous solution of an oxide or hydroxide thereof, and the oxide of silicon by an aqueous solution of a suitable silicate. A metal M in the form of a cation $R^+$ can be supplied by a hydroxide or an organic or inorganic salt thereof.

Crystal size and crystallization time of the ZSM-23 composition will vary with the nature of the reaction mixture employed.

The reaction mixture composition for the synthesis of ZSM-23 crystals may be prepared from materials which can supply the appropriate oxide. Useful sources of $X_2O_3$, e.g. aluminium oxide, iron oxide, and/or boron oxide, include, as non-limiting examples, any known form of such oxide, e.g., aluminum oxide or hydroxide, organic or inorganic salt or compound, e.g., alumina, aluminates, and borates. Useful sources of $YO_2$, e.g., silicon oxide, include, as non-limiting examples, known forms of such oxide, e.g., silicic acid or silicon dioxide, alkoxy- or other compounds of silicon, including silica gel and silica hydrosol.

It should be noted that the relative amount of the components of the reaction mixture required in the present disclosure are often critical to achieving the desired reaction/product characteristics. For instance, the relative amounts in a preferred embodiment for preparing a ZSM-23 is: 1.0 $SiO_2$: 0.006 $Al_2O_3$:0.125 NaOH:1.68 isopropyl amine: 45$H_2O$, based on the molar ratios of the respective components. More generally, the relative amounts of silica to aluminum compound to metal hydroxide to structure directing agent to water include the following ranges, based on molar ratios of the respective components:

Silica: 1.0

Aluminum compound: 0.001 to 0.1, preferable 0.003-0.05, more preferably 0.004 to 0.01, most preferably 0.005 to 0.007

Metal hydroxide: 0.001 to 1.0, preferably 0.025 to 0.5, more preferably 0.1 to 0.250, most preferably 0.11 to 0.15

Structure directing agent: 0.1 to 15.0, preferably 0.25 to 10, more preferably 0.75 to 5.0, most preferably 1.0 to 2.0

Water 5 to 200, preferably 15 to 150, more preferably 30 to 75, most preferably 40 to 50

It will be understood that each oxide component utilized in the reaction mixture for the present disclosure may be supplied by one or more essential reactants and they can be mixed together in any order. For example, any oxide can be supplied by an aqueous solution. Crystal size and crystallization time for the product MTT zeolite may vary somewhat with the exact nature of the reaction mixture employed.

A general advantage of the crystallization method described herein lies in its ability to provide relatively small crystals at higher rates of productivity compared to known hydrothermal crystallization procedures. Such crystals typically exhibit greater catalytic activity because their relatively small size permits faster diffusion of reactants into, and products out of, the catalyst.

While the rate of nucleation is not greatly influenced by temperature, crystal growth is fairly temperature-sensitive so that when conventional hydrothermal processes are utilized in obtaining relatively small crystals, it is necessary to reduce the temperature and concomitantly, increase the time, required to effect crystallization.

Longer crystallization periods not only reduce productivity, but they also increase the risk that the desired crystalline material will become contaminated with undesirable crystalline material. The unexpectedly rapid crystallization rates which are made possible by the method of the present disclosure permit one to obtain smaller crystals within a shorter period than is possible with conventional hydrothermal crystallization techniques and with less risk of contamination than with the latter procedures.

In a microwave reactor, the temperature can be raised quickly compared with conventional heating. The heat can be transferred to the aqueous species rapidly and efficiently. With this high heating rate, the tendency to produce by-product can be reduced. On the other hand, in conventional autoclave reactor for instance, the heat is transferred consecutively from heating source (oven) to the lining of the autoclave, then finally to the water medium. According to the present disclosure, it was discovered that the rapid heating of MAHyS both accelerates nucleation and also consequently reduces the introduction of impurity phases.

Microwave heating is employed in the crystallization methods of the present disclosure not only to direct the crystallization mechanism but also to increase the rate of crystallization. The useful frequency range of microwave energy herein includes electromagnetic frequency ranges from about 600 to about 50,000 MHz, preferably about 900 to about 30,000, more preferably about 900 to about 3600 MHz, and most preferably about 915 to about 2450 MHz.

In order to be suitably exposed to the microwave energy, the crystallization medium must be contained within a vessel fabricated from a material which absorbs little or none of the microwave energy, e.g., the polytetrafluoroethylenes, quartz, ceramic, polypropylene, polyethylene, some polyesters, alumina, beryllia, some silicones, some phenolics, and polyphenylene oxide. Other materials moderately low in absorption of microwave energy and which are therefore useful herein are: cured epoxies, alkyds, polyester, urethanes, glass, polyamides, polyimides, some phenolics, some melamines, and polycarbonates.

Both meandering wave guides and resonating cavities can be used as means for exposing the crystallization medium to be heated to microwave radiation. The meandering wave guide system has the disadvantage of requiring a relatively shallow bed depth. This is caused by the nature of the propagation of the electromagnetic radiation and the necessity for confining it within a hollow wave guide. In order to best utilize the electromagnetic radiation for heating, it is necessary to pass the crystallization medium to be heated through the center of the meandering wave guide since at the top and bottom of the wave guide the electric field is at its maximum while at its sides it as at its minimum.

A shallow bed depth requires a relatively narrow opening in the wave guide. Consequently, there is no danger of radiation leakage out of the wave guide. As the bed depth increases, the height of the opening increases up into the zone of high field intensity allowing radiation leakage and resulting in lower overall heating efficiency. Accordingly, a preferred crystallization method utilizes a resonating cavity device since the bed depth is not so limited.

While the duration of exposure to the selected level of microwave energy can vary in the present disclosure, and in any event will depend upon the composition of the crystallization reaction medium, as well as the configuration of the equipment and other apparent factors, periods from about 6 to 72 hours are found to be suitable in the preparation of most MTT zeolites.

Essentially any medium from which a crystalline material can be formed is suitable for practicing the present disclosure. In the case of MTT zeolites, a heat transfer agent susceptible to microwave energy which is a constituent of the crystallization medium herein can be water or an organic compound, e.g., a liquid hydrocarbon, an alkylene glycol such as ethylene glycol, etc. Materials which absorb microwave energy do so by vibrating at the same frequency as the microwave. In contrast, if the heat transfer agent reflects or is transparent to microwave energy, it is not considered to be susceptible to microwave energy.

The crystallization temperature for the present disclosure will vary according to the MTT zeolite being prepared. However, the crystallization temperature is usually controlled by controlling microwave power application to set the crystallization temperature to a temperature falling within the range from about 150° C. to about 200° C. A more preferred temperature range is from about 160° C. to about 180° C.

In a typical synthesis of an MTT zeolite, the reaction mixture is heated via microwave irradiation at about 180° C. with different synthesis time for 8 to 24 hours. The as-synthesized zeolites are then centrifuged and washed then dried at about 110° C. for 12 hours. The OSDA is removed by calcination at about 550° C. for 12 hours under a flow of a gas such as air with a heating rate of 1 K/min (1° C./min). The resulting calcined zeolite (e.g., Na-ZSM-23) is then ion-exchanged and re-calcined to obtain the produced MTT zeolite (e.g., H-ZSM-23).

The synthesis of MTT zeolites in the present disclosure may be facilitated by including seed crystals in the reaction mixture. Seeding is an especially effective technique in the preparation of ZSM-23. The use of at least 0.01%, preferably at least 0.10%, and even more preferably about 1% seed crystals (based on total weight) of the crystalline material is found to be beneficial.

ZSM-23 produced by conventional techniques often has a very high crystal-aspect-ratio (>400). In order to fabricate crystals having a low aspect-ratio, nucleation and growth of MTT zeolites may be controlled by seed-assisted synthesis under microwave irradiation. Furthermore, isopropyl amine, as the organic structure directing agent (OSDA), was found to provide a ZSM-23 with superior characteristics. In the present disclosure, the crystal aspect-ratio may be significantly reduced relative to conventional techniques—such as from 400 to 9.

According to the present disclosure, when isopropyl amine is used as an OSDA, superior textural properties of the resulting crystalline ZSM-23 are obtained by adjusting two important synthesis parameters: the water content (with $H_2O/SiO_2$ being less 40) and the crystallization time. A lower crystal aspect ratio and suppressed phase impurities in the formed MTT zeolites were obtained when the crystallization temperature was set to about 180° C.

The seed-assisted preparation of MTT zeolites in the presence of 1 wt. % seeds was also found to produce well-defined rod-like crystals with the crystal sizes smaller than 400 nm. The crystallization time by using MAHyS and seeded-assisted synthesis to produce nanometer sized ZSM-23 crystals was reduced to only about 6 hours. Moreover, the seed-assisted synthesis of MTT zeolites was found to produce zeolites without impurity phases, such as dodecasil.

This reduction in the crystal aspect-ratio of the resulting column-shape crystals of ZSM-23 was found to reduce the mass-transfer limitation to catalysis and also to reduce the deactivation rate in zeolite catalysts having one-dimensional pore systems. Relatively large surface area MTT zeolites (compared with similar 1D pore zeolites) with improved surface area of about 200 m$^2$/g and a total pore volume of about 0.13 cm$^3$/g were obtained.

The inventive crystals are not dense agglomerations of ZSM-23 as previously reported, see K. Möller, T. Bein, Crystallization and porosity of ZSM-23, *Micropor. Mesopor. Mater.*, 143 (2011) 253-62. Without being bound to such theory, it is believed that this improved morphology is due to a slower agglomeration rate compared to the crystallization rate. The absence of agglomerated needles occurs when a stirred reaction mixture is subject to microwave irradiation.

In another aspect of the present disclosure, MTT zeolites prepared by the inventive process can undergo metal replacement. Typical replacing components include hydrogen, ammonium, alkyl ammonium and aryl ammonium and metals, other than metals of Group IIIA, including mixtures of the same. The hydrogen form may be prepared, for example, by substitution of original sodium with ammonium.

For example, the original cations of the as synthesized ZSM-23 can be replaced by ion exchange with other cations. Preferred replacing cations include metal ions, ammonium ions, hydrogen ions and mixtures thereof. Particularly preferred cations are those which render the zeolite catalytically active, especially for hydrocarbon conversion. These include hydrogen, rare earth metals, aluminum metals of Groups IIA, IIIB, IVB, VIII, IB, IIB, IIIA and IVA.

As mentioned above, synthetic ZSM-23 can have the original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earth, Mn, Ca, Mg, Zn, Cd, Pd, Ni, Ti, Al, Sn, Fe and Co.

Typical ion exchange techniques comprise contacting the synthetic ZSM-23 zeolite with a salt of the desired replacing cation or cations. Although a wide variety of salts can be employed, particular preference is given to chlorides, nitrates and sulfates. Representative ion exchange techniques are disclosed in a wide variety of patents including U.S. Pat. Nos. 3,140,149; 3,140,151; and 3,140,253.

Following contact with the salt solution of the desired replacing cation, the zeolite is preferably washed with water and dried at a temperature ranging from 50° C. to about 300° C., and thereafter may be calcined in air or other inert gas at from about 200° C. to a temperature below the zeolite decomposition temperature, preferably about 700° C. The time required ranges from 1 to 48 hours or more to produce a catalytically-active thermal decomposition product thereof. Regardless of the cations replacing the alkali metal in the synthesized form of ZSM-23, the spatial arrangement of the aluminum, silicon and oxygen atoms which form the basic crystal lattices of ZSM-23 remains essentially unchanged by the described replacement of alkali or alkaline earth metal as determined by taking an X-ray powder diffraction pattern of the ion-exchanged material.

In order to increase the pore-volume of MTT zeolites, selected samples were modified by alkaline treatment. ZSM-23, a high silica zeolite (Si/Al=40-100), was treated with different concentration of NaOH by using different heating method. The alkaline treatment or so-called desilication is common technique to improve porosity. However, this treatment may adversely affect zeolite morphology, partially block micropores, and could cause uncontrolled Al removal.

After desilication, aluminum is still located in the framework of the zeolite ZSM-23 as confirmed solid-state $^{27}$Al MAS. Furthermore, alkaline treatment did not change the total acidity as determined from the NH3-TPD experiments. The crystallinity of the MTT zeolites was preserved after desilication—as determined from XRD patterns of parent zeolite crystals and alkaline-treated crystals showing similar intensities at the same peak positions.

The isotherms of MTT zeolites were studied before and after desilication. At low relative pressure (p/p0) up to p/p0=0.7, a slight increase in nitrogen uptake in desilicated MTT was observed. At high relative pressure (p/p0>0.7), the nitrogen update increased considerably. An increase in total pore-volume of MTT was observed up to 0.334 cm$^3$/g due to alkaline-treatment.

Synthetic ZSM-23 crystals prepared in according with the present disclosure can be used either in the as-synthesized form, the hydrogen form, or another univalent or multivalent cationic form. They can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components may be exchanged into the composition, impregnated therein or physically intimately admixed therein. Such components may also be impregnated in or onto the ZSM-23 such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

Synthetic ZSM-23 crystals, when employed either as an adsorbent or as a catalyst in a hydrocarbon conversion process, should be dehydrated at least partially. This can be done by heating to a temperature in the range of about 65° C. to about 315° C. in an inert atmosphere, such as air, nitrogen, etc. and at atmospheric or sub-atmospheric pressures for between 1 and 48 hours. Dehydration may be performed at lower temperature merely by placing the zeolite in a vacuum.

ZSM-23 crystal compositions prepared by the present disclosure have characteristic X-ray diffraction patterns.

The crystalline ZSM-23 zeolites prepared by the present disclosure are formed in a wide variety of particle sizes. Such particles can generally be in the form of a powder, a granule, or a molded product. In cases where the catalyst is molded, such as by extrusion, the crystalline material can be extruded before drying or dried or partially dried and then extruded.

In embodiments where the MTT zeolites of the present disclosure are catalysts, it may be desired to incorporate the product crystals with another material resistant to the temperatures and other conditions employed in the certain processes to be catalyzed. Such matrix materials include active and inactive materials and synthetic or naturally occurring zeolites as well as inorganic materials such as clays, silica, and/or metal oxides, e.g., alumina, titania and/or zirconia. The latter may be either naturally occurring or in the form of gelatinous precipitates, sols or gels including mixtures of silica and metal oxides. Use of a material in conjunction with a ZSM-23 may enhance the conversion and/or selectivity of the catalyst in certain organic conversion processes.

Synthetic ZSM-23 zeolites of the present disclosure may be used in a wide variety of organic compound conversion reactions. They are especially useful in the processes of polymerization, aromatization, reforming, esterification and cracking. Other hydrocarbon conversion processes for which ZSM-23 may be utilized in one or more of its active forms include, for example, hydrocracking and converting light aliphatics to aromatics. ZSM-23 zeolites of the present disclosure are also useful in the processes of toluene disproportionation and alkylation, catalytic dewaxing, olefin polymerization and aromatization of olefins or paraffins.

A remarkable reduction in crystallization time from 66 hours for a comparable conventional hydrothermal synthesis to only 12 hours was observed in this work. The effect of the synthesis parameters on crystallinity and crystal habits was investigated in detail. A relatively low crystal-aspect-ratio of only 10 was verified from different irradiation times. Reduction of the crystal aspect ratio (crystal length per diameter) of the rod-shape crystal of ZSM-23 significantly reduces the mass-transfer limitation and correspondingly reduces deactivation rate in the resulting zeolite catalysts.

Phase impurities were also suppressed and the tendency of rod-like crystal to form bundles of needles was not observed. It is believed that these phenomena occur due in part to a slower aggregation rate for the MTT crystals in the present disclosure.

The effect of seeding in the synthesis mixture was also studied. The presence of seeds in the synthesis mixture were shown to further promote the reduction of the nucleation time and to ensure the dominance of crystalline phase.

Applicants know of no prior art method for preparing MTT zeolites (including ZSM-23) possessing the remarkably improved properties observed with the present disclosure.

EXAMPLES

The following examples are provided for illustration purposes only and the in no way limit the scope of the present invention. Other types of MTT zeolites and process conditions are also applicable to the present invention.

A rapid synthesis of MTT zeolites was carried out by using a microwave reactor. Modification of the crystal aspect ratio was initiated by variation of synthesis parameters, such as the crystallization time period. The applicability of seed-assisted synthesis and post-treatment were also investigated. Zeolites were synthesized in static mode (without stirring) and in dynamic mode (with stirring or rotation).

A controlled nucleation and crystallization of the MTT zeolite ZSM-23 was conducted using MAHyS of a mixture containing colloidal silica (40 wt. %), aluminum sulfate ($Al_2(SO_4)_3 \cdot 18H_2O$), isopropyl amine (IPA), sodium hydroxide (NaOH) and de-ionized water. The molar ratios of the reaction mixture was: 1.0 $SiO_2$:0.006 $Al_2O_3$:0.125 NaOH:1.68 isopropyl amine:45$H_2O$.

A solution gel was prepared by dissolving 0.31 g of NaOH in 43.96 g of de-ionized water, then adding 0.25 g of $Al_2(SO_4)_3 \cdot 18H_2O$ to form an aluminate solution. After vigorous stirring for 5 min, 6.17 g IPA was added with a drop-wise manner to form a clear solution. Finally, 9.31 g of a colloidal silica (40 wt. %) was added and the mixture was stirred vigorously before being transferred to a PTFE vessel. The colloidal silica (SNOWTEX-40™, ST-4, 40 wt. % of $SiO_2$ and 0.5 wt. % $Na_2O$) was produced by Nissan Chemicals. The $SiO_2$ particle size ranged from 10-20 nm.

A solution gel prepared was heated at 453 K (180° C.) in a microwave reactor (MicroSYNTH, Milestone, 800 W) with different crystallization time periods ranging from 12 to 24 hours at a constant crystallization stirring speed of 300 rpm. The as-synthesized zeolites were then centrifuged and washed then dried at 393 K (120° C.) for 12 hours. The OSDA (IPA) was removed by calcination at 823 K (550° C.) for 12 hours under a flow of air with the heating rate of 1 K/min (1° C./min). The calcined zeolites (Na-ZSM-23) were then ion-exchanged and calcined again to obtain H-ZSM-23.

In terms of nomenclature, an example obtained by microwave-assisted synthesis at a crystallization temperature of 180° C. and for a crystallization time period of 18 hours is referred as MTT-M-180-18 h. Another sample with a longer crystallization time period of 72 hours aging time is designated with the suffix: -72 h.

Characterization techniques including X-ray diffraction (XRD), field-emission scanning electron microscopy (FE-SEM), nitrogen adsorption-desorption, $NH_3$-TPD, and solid-state $^{27}Al$ MAS NMR were applied to analyze the physiochemical properties of prepared zeolites.

The Effect of the Crystallization Time Period

The effect of the crystallization time period under microwave irradiation was investigated. The irradiation time period was varied from several minutes, 1 hour, 2 hours until 8 hours (these not shown). An amorphous phase was observed in those samples. After 8 hours, some sharp patterns began to appear in the XRD spectra. After 12 hours irradiation time, all peaks assigned to the MTT zeolite ZSM-23 were observed as shown in FIG. 1.

A partial degree of crystallization was observed after a crystallization time of 12 hours, with significantly more crystallization observed after 18 hours, and remarkably a full crystallization was observed after only 24 hours. This short crystallization time is unique in the preparation of ZSM-23 obtained by both conventional and known techniques employing MAHyS. To prevent formation of large particles, the MAHyS synthesis was terminated after 24 hours.

Figure 1:
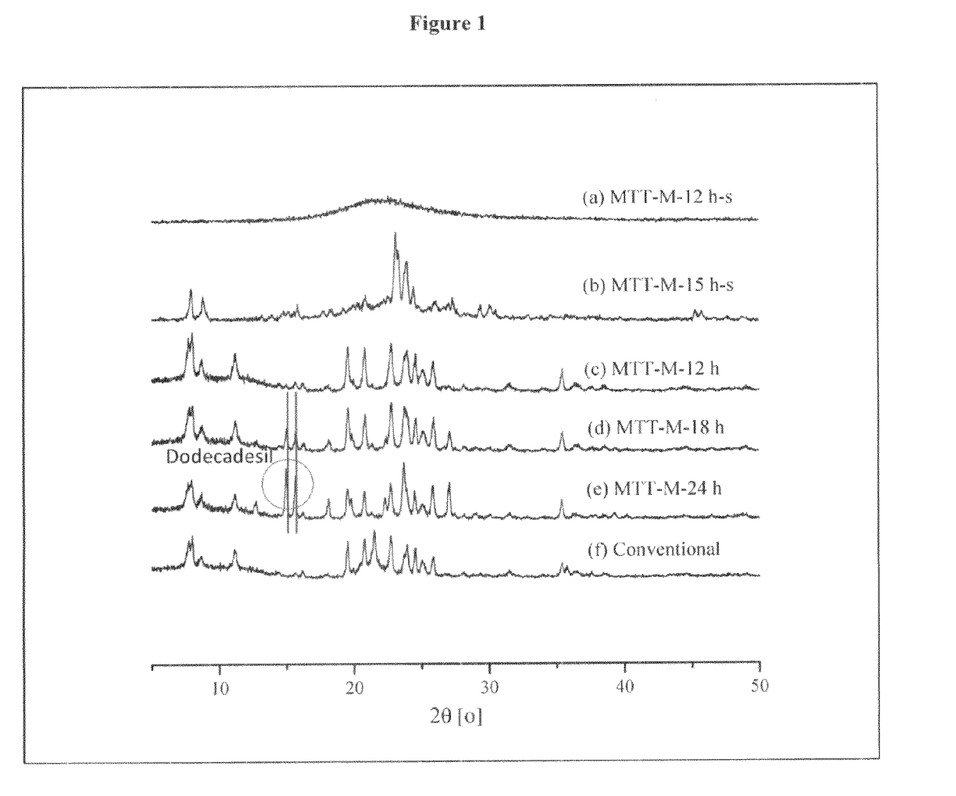
FIG. 1 depicts XRD patterns of MTT zeolites prepared by MAHyS with different reaction/crystallization times at 180° C. using the process disclosed herein versus a conventional synthesis.

Whereas the crystallization time period (required to achieve full crystallization) for conventional heating was found to be 68 hours, the comparable crystallization time period for the present disclosure employing both MAHyS and an OSDA was remarkably reduced to only 12 hours as shown in FIG. 1.

Figure 2A:
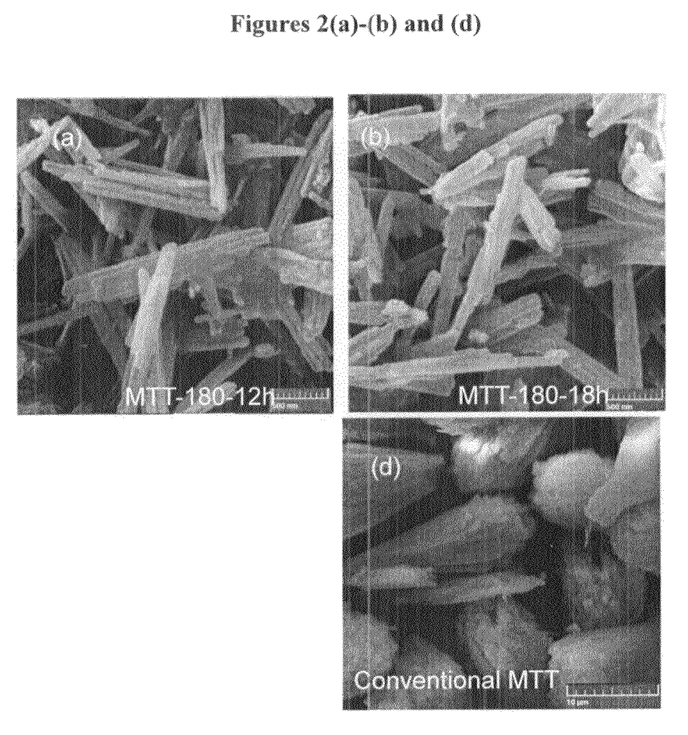

The FE-SEM Images depicted in FIG. 2 show that the microwave synthesized MTTs are rod-like shapes. In contrast to the ZSM-23 crystals obtained using a conventional synthesis, the inventive ZSM-23 crystals did not form dense agglomerations. This appears consistent with a slower agglomeration rate as compared to the crystallization rate. The absence of agglomerated zeolite crystals in the MTT zeolites of the present disclosure may also be due in part to the microwave irradiation with stirring.

Morphological features of the MTT zeolites produced by the present disclosure show rod like or column-like crystals with the crystal size ranging from 700 nm to 150 nm for a crystallization time period of 12 hours (see FIG. 2.a) and at 18 hours (see FIG. 2.b) irradiation time.

It is known in the art that the synthesis time of typical one-dimensional zeolites is not easily reduced. This difficulty is thought to be due to the crystal growth habit which tends to form rod-like or needle-like morphologies.

After a crystallization time period of 24 hours under MAHyS conditions, the crystal sizes become more uniform, forming column-like crystals with size of ca. 880 nm. Table 1 presents the average lengths, diameters and aspect ratios (length/diameter) for MTT zeolites synthesized by MAHyS with crystallization time periods of 12 hours, 18 hours, and 24 hours.

TABLE 1

Table 1. Ratio between crystal length and diameter of MTT zeolites.

| Parameters | MTT-MW12 | MTT-MW18 | MTT-MW24 |
|---|---|---|---|
| Length, L (nm) | 889 | 907 | 945 |
| Diameter, D (nm) | 75 | 82 | 112 |
| Length/diameter, L/D [—] | 12 | 11 | 9 |

Remarkably, the aspect ratios of the MTT zeolites produced with crystallization time periods ranging from 12 to 24 hours did not exceed 12. The aspect ratio of MTT zeolites synthesized with a crystallization time period limited to 24 hours was only 9, which is surprisingly low compared to MTT zeolites synthesized using conventional heating wherein aspect ratios ranging from about 50 to about 400 are observed. See C. Baerlocher, W. H. Meier, D. H. Olson, Atlas of Zeolite Frameworks Types, (5th revised ed., Elsevier, Amsterdam, 2001), 266.

Surprisingly, the aspect ratios of MTT zeolites produced by the process of the present disclosure tend to reduce with increased synthesis time (see Table 1). Only relatively minor variations in crystal diameter were observed as the crystallization time period was increased. Specifically, the crystal diameter increases slightly with the increase of synthesis time from 75 nm, 82 nm and 112 nm for synthesis at 12 hours, 18 hour and 24 hours, respectively.

The process of the present disclosure allows control and reduction of the crystal aspect ratios (crystal length per diameters) of column-shaped crystal of ZSM-23. This effect is expected to significantly reduce the mass-transfer limitation and correspondingly reduce the deactivation rate in ZSM-23 zeolite catalysts possessing a one-dimensional pore system.

Figure 3:
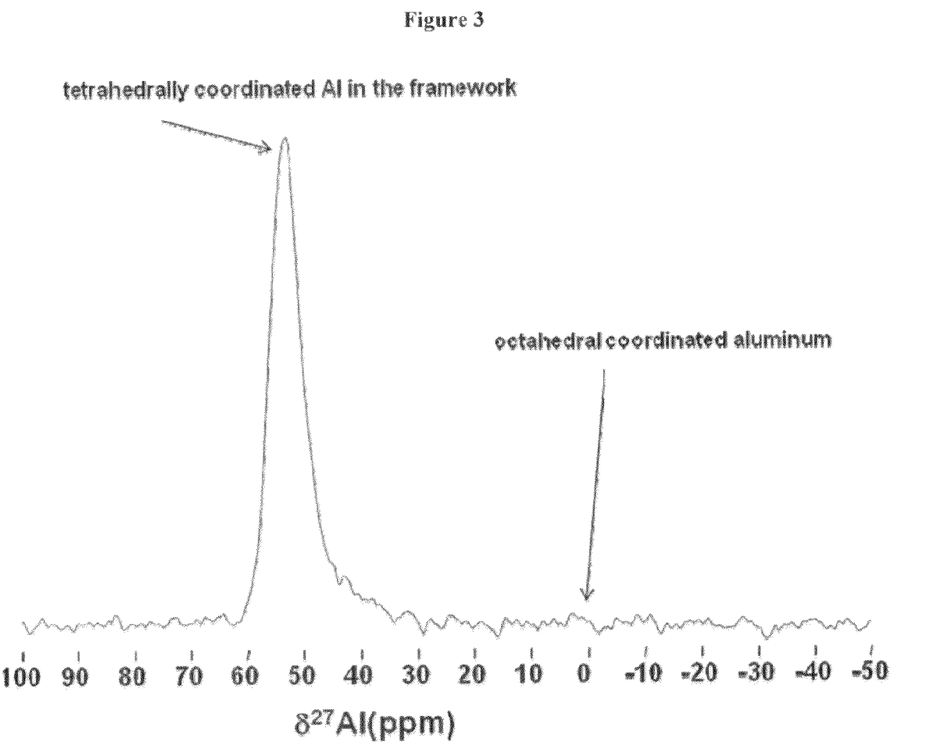
FIG. 3 depicts a solid-state $^{27}Al$ MAS NMR spectrum of calcined MTT zeolite produced by MAHyS after 18 hours.

In order to investigate the aluminum coordination in the microwave synthesized MTTs produced by the present disclosure, solid state $^{27}$Al MAS NMR spectra of calcined MTT zeolites synthesized by MAHyS (represented by MTT-M-180-18 h) was performed. As shown in FIG. 3, a strong signal centered at about δ=56 ppm was the only observed peak. This peak corresponds to tetrahedral coordination of aluminum and suggests that all aluminum is located in the framework of zeolite ZSM-23. The $^{27}$Al NMR spectrum shows no peak at 0 ppm which confirms that there is no octahedral coordinated aluminum (extra framework).

The Effect of Seeding in Microwave-Assisted Synthesis of MTT Zeolites

Figure 4:
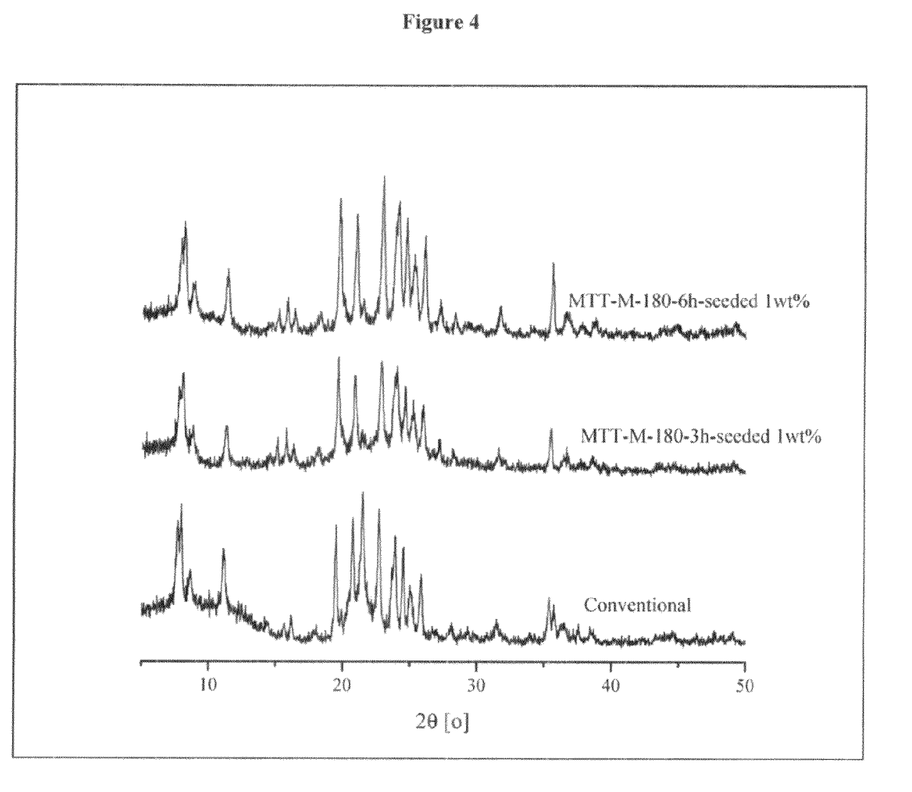
FIG. 4 depicts XRD patterns of MTT zeolites synthesized by MAHyS and seeded with 1 wt. % seeds using different irradiation times at 180° C. and by a conventional hydrothermal synthesis.

FIG. 4 shows XRD patterns of MTT zeolites seeded with 1 wt. % of seeds. The crystallization time period of the seed-assisted syntheses under MAHyS was varied from 3 hours to 6 hours. The XRD patterns show that both samples have good crystallinity of MTT zeolites. The presence of ZSM-23 seeds reduced the required time in nucleation step. The intensity of XRD patterns of seeded ZSM-23 samples are comparable with the intensity of conventional ZSM-23 synthesized by using hydrothermal synthesis in normal autoclaves.

Figure 5A:
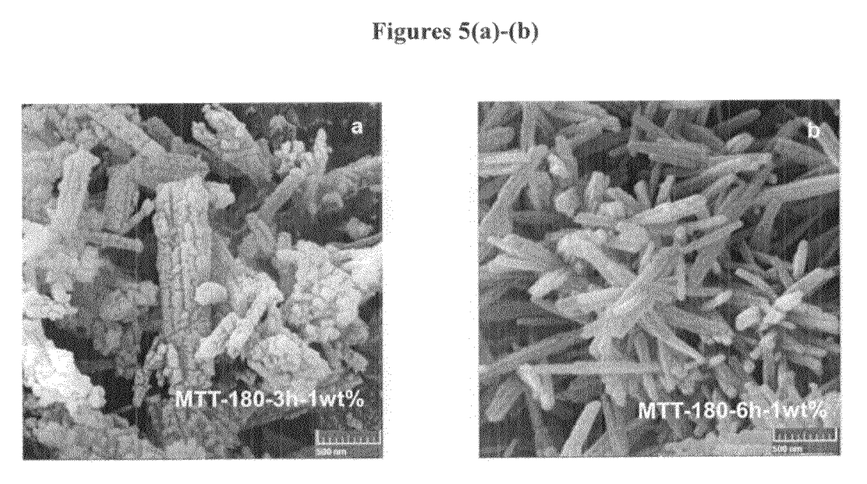

As shown in FIG. 5, the morphology of an MTT zeolite formed with seed assistance after only 3 hours (FIG. 5.a) includes crystals with defective, irregular shapes and crystal intergrowth. Surprisingly, however, increasing the crystallization time period to 6 hours produced well-defined column-like crystals with the sizes ranging from 600 nm to 900 nm.

This finding suggests that, when carrying out the present disclosure with 1 wt. % of seeds, the crystallization time period under MAHyS conditions can be reduced to as little as 6 hours. This is especially surprising for the MTT zeolite ZSM-23. The presence of seeds in the synthesis of the present disclosure appears to promote the reduction of the nucleation time while at the same time inducing a preferred dominance of the desired crystalline phase in the targeted MTT zeolites.

It has been discovered that the present disclosure employing MAHyS in the presence of certain OSDAs provides for a rapid synthesis (crystallization) of MTT zeolites, including ZSM-23, in which both crystal size and morphology may be controlled. Unlike the conventional techniques which produce large seed crystals (ca. 20 micrometer), the size of the crystals in present microwave-assisted synthesis can be controlled to less than 1000 nm.

Catalysts Produced from MTT Zeolites

MTT zeolites of the present disclosure were also applied as catalysts to produce propylene with high selectively in n-hexane cracking. The n-hexane was chosen as a model compound for naphtha. 10-MR zeolites possessing one-dimensional pore systems are known to act as catalysts with good selectivity in the cracking of naphtha to form propylene. However, in these conventional catalytic reactions rapid deactivation of the MTT zeolite is observed.

Employing MTT nanocrystals produced by the present disclosure, by contrast, yields greater selectivity for propylene (versus ethylene) and without significant deactivation of the MTT zeolite catalyst. It is believed that these positive effects are due to the relatively small dimensions of the inventive zeolite crystals with reduced diffusion path lengths. Surprisingly, the propylene to ethylene (P/E) ratio surpassed 2. This high P/E ratio makes the inventive MTT zeolites suitable as selective catalysts for: (i) catalytic cracking of naphtha to produce high yield propylene; (ii) petrochemical-FCC, a dedicated fluid catalytic cracking unit for propylene production; and (iii) related shape-selective applications in petroleum and petrochemicals.

In summary, a main advantage of the present disclosure relates to the discovery of a rapid synthesis of MTT zeolites, yielding zeolites with greater control of both crystal size and morphology. The present microwave-assisted synthesis of ZSM-23 for example is much faster than conventional hydrothermal syntheses. Consequently, power consumption can be reduced, and process will also be useful in the deposition of zeolite crystals on many different substrates including zeolite membranes and zeolitic coatings. MTT zeolites produced according to the present disclosure have been shown to be effective catalysts having improved selectivity and lifetime relative to MTT zeolites produced using convention methods.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

What is claimed is:

1. A process for preparing an MTT zeolite, the process comprising:
    preparing a sol-gel by mixing a metal hydroxide with water, then mixing with an aluminum compound, to form an aluminate solution, to form the sol-gel;
    mixing a structure directing agent with the sol-gel, in a controlled manner over an addition time period, to form a structure directing mixture;
    mixing a silica with the structure directing mixture to form a reaction mixture;
    heating the reaction mixture in a microwave reactor at a crystallization temperature for a crystallization time period with stirring at a crystallization stirring speed, to form an initial zeolite; and
    removing the structure directing agent to form the MTT zeolite,
    wherein the crystallization time period ranges from 12 hours to 72 hours.

2. The process of claim 1, wherein the structure directing agent is an organic structure directing agent.

3. The process of claim 1, wherein the structure directing agent is isopropyl amine.

4. The process of claim 1, wherein the structure directing agent is isopropyl amine and the MTT zeolite is a ZSM-23 zeolite.

5. The process of claim 4, wherein a crystal aspect ratio of the ZSM-23 is less than or equal to 12.

6. The process of claim 5, wherein the crystallization time period ranges from 12 hours to 24 hours to form rod-like or column-like crystals ranging from 75 nm to 700 nm.

7. The process of claim 4, wherein:
    the metal hydroxide is sodium hydroxide;
    the aluminum compound is an aluminum sulfate;
    the structure directing agent is isopropyl amine;
    the silica is a colloidal silica;
    the crystallization temperature is equal to or greater than 170° C. and equal to or less than 190° C.;
    the crystallization time period is equal to or less than 18 hours; and
    the crystallization stirring speed is greater than or equal to 250 rpm and equal to or less than 300 rpm.

8. The process of claim 4, wherein the reaction mixture comprises the following components:
    $SiO_2$: 1.0;
    aluminum sulfate: 0.005 to 0.007
    NaOH: 0.11 to 0.15
    isopropyl alcohol: 1.0 to 2.0; and
    de-ionized water: 40 to 50,
based on relative molar ratios.

9. The process of claim 4, wherein the crystallization time period ranges from 12 hours to 24 hours to form rod-like or column-like crystals ranging from 75 nm to 700 nm.

10. A ZSM-23 zeolite, produced by the process of claim 4.

11. A zeolite membrane, comprising the ZSM-23 zeolite of claim 10.

12. A zeolite coating layer, comprising the ZSM-23 zeolite of claim 10.

13. A zeolite catalyst, comprising the ZSM-23 zeolite of claim 10.

14. The process of claim 1, wherein the reaction mixture comprises the following components:
    Silica: 1.0;
    Aluminum compound: 0.001 to 0.1;
    Metal hydroxide: 0.001 to 1.0;
    Structure directing agent: 0.1 to 15.0; and
    water: 5 to 200,
based on relative molar ratios.

15. The process of claim 1, wherein the reaction mixture comprises the following components:
    Silica: 1.0
    Aluminum compound: 0.004 to 0.01;
    Metal hydroxide: 0.1 to 0.250,
    Structure directing agent: 0.75 to 5.0, and
    water: 30 to 75,
based on relative molar ratios.

16. The process of claim 1, wherein the crystallization stirring ranges from 200 to 300 rpm.

17. The process of claim 1, wherein a frequency of the microwave reactor ranges from about 900 MHz to about 3600 MHz.

18. The process of claim 1, wherein a reaction vessel containing the reaction mixture is a PTFE reaction vessel equipped with a fiber optic monitoring device.

19. An MTT zeolite, produced by the process of claim 1.

* * * * *